United States Patent [19]

Leiber

[11] Patent Number: 4,478,461
[45] Date of Patent: Oct. 23, 1984

[54] HYDRAULIC DUAL-CIRCUIT SERVO BRAKE APPARATUS

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 411,139

[22] Filed: Aug. 24, 1982

[30] Foreign Application Priority Data

Nov. 14, 1981 [DE] Fed. Rep. of Germany ....... 3145323

[51] Int. Cl.³ .............................................. B60T 17/18
[52] U.S. Cl. .......................................... 303/92; 303/2
[58] Field of Search ................ 303/2, 3, 20, 52, 84 A, 303/84 R, 92, 93, 96, 103, 111, 116

[56] References Cited

U.S. PATENT DOCUMENTS 3,961,828 6/1976 Eckert et al. .......................... 303/92
3,973,806 8/1976 Inada et al. ............................ 303/92
4,003,607 1/1977 Haney et al. .......................... 303/92

FOREIGN PATENT DOCUMENTS 2723847 12/1978 Fed. Rep. of Germany ........ 303/92

Primary Examiner—Duane A. Reger
Attorney, Agent, or Firm—Edwin E. Greigg

[57] ABSTRACT

A hydraulic dual-circuit servo brake apparatus is provided with a control valve, which is intended for directing the pressure medium of a pressurizing device into the brake circuit. The control valve is embodied as a magnetic valve, which is actuatable via signal transducers, valves, or the like in accordance with the given position of the main cylinder pistons. The control valve may be combined with an anti-skid apparatus such that the magnetic valve is also actuatable in accordance with the functioning of the anti-skid means. An integration of the magnetic valve with multiple-position valves of an anti-skid control means is possible.

15 Claims, 7 Drawing Figures

HYDRAULIC DUAL-CIRCUIT SERVO BRAKE APPARATUS

BACKGROUND OF THE INVENTION

The invention is based on a hydraulic dual-circuit servo brake apparatus. A servo brake apparatus of this type is known (German Offenslegungsschrift No. 29 42 979).

In this known servo brake apparatus, a main cylinder piston, after executing a certain stroke, pushes open a valve which permits pressure medium to flow out of a reservoir into a brake circuit. An apparatus of this type has the disadvantage that if there is a failure of one brake circuit, the supply of pressure medium is soon exhausted. When a hydraulic booster is also connected to the system, this means that the booster will fail as well.

If a known apparatus of this type is combined with an anti-skid apparatus, then the main cylinder piston and with it the brake pedal must execute an additional stroke whenever the anti-skid means is functioning. At smaller pressure, a longer travel is necessary and with larger pressure values a shorter travel is necessary to reach the pressure supply point. Such a control means is confusing to the driver, however, and thus unsatisfactory.

OBJECT AND SUMMARY OF THE INVENTION

The hydraulic dual-circuit servo brake apparatus has the advantage over the prior art that when one brake circuit fails the supply of energy remains intact. A further advantage is that when the anti-skid means is operating the brake pedal will not travel to the floor.

A further advantage is that the operation of the anti-skid means can be perceived by the driver at the pedal, and the influence of this means can be adjusted via a timed manner of supplying the pressure.

A further advantage is that in accordance with one characteristic, switches actuated by the main cylinder piston are used, in order to indicate the failure of one brake circuit to the driver.

It is again advantageous, in accordance with a further characteristic of the invention, that the signals of this switch can be used for diagnosing the valve functions.

Finally, it is advantageous that the volume of pressure medium withdrawn in order to reduce pressure in the brake cylinders when the anti-skid means is operating can be separately supplied for each brake circuit.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
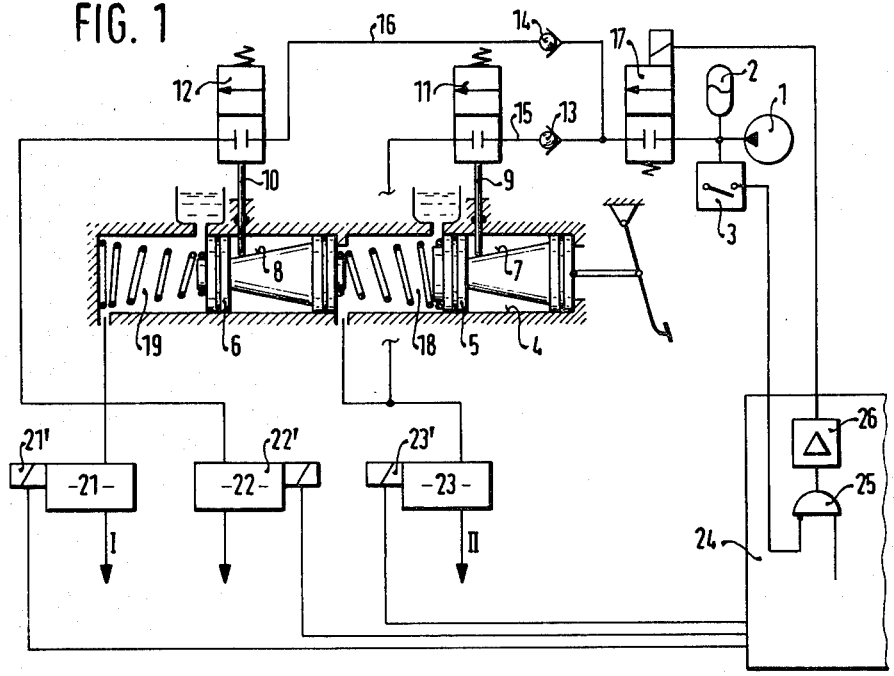
FIG. 1 shows a system in accordance with the invention, having two valves dependent on piston travel and one 2/2-way magnetic valve.

A hydraulic dual-circuit servo brake apparatus has a pressurizing device equipped with a pump 1 and a reservoir 2; it is provided with a warning pressure switch 3 for the event that the reservoir pressure may be excessively low. A pedal-actuated hydraulic dual-circuit main cylinder 4 is also provided, the two pistons 5 and 6 of which are provided with oblique faces 7 and 8, along each of which one actuation push rod 9 and 10, respectively of two 2/2-way valves 11 and 12, respectively can slide. Each push-rod-actuated 2/2-way valve 11 and 12 has a respective connecting line 15 or 16, monitored by a check valve 13 or 14, leading via a single line to a 2/2-way magnetic valve 17, with which the pressurizing device 1/2 can be connected to or separated from the valves 11 and 12.

Respective work chambers 18 and 19, which are connected via respective magnetic valves 23 and 21 to respective brake circuits II and I of a front axle are located ahead of the main cylinder piston 5 and 6, respectively. A third magnetic valve 22 is connected directly to the 2/2 valve 12; the valve 22 monitors a rear axle brake circuit. The three magnetic valves are the control valves of anti-skid apparatus. Its magnets 21', 22', 23' are connected via electric lines to an electronic switching device 24, to which further lines also lead from sensors (not shown) monitoring the wheel behavior. In addition to the switching members (not shown) of the anti-skid apparatus, an AND gate 25 and a final output stage 26 are also located in the switching device 24.

MODE OF OPERATION

Upon the actuation of the brake pedal, the two 2/2-way valves 11 and 12 are switched over by the two pistons 5, 6 via push rods 9 and 10. However, this action has no effect if the anti-skid apparatus is not functioning. If the anti-skid means has been switched on, however, a signal is present at the AND gate 25 ahead of the final power stage 26. If the pressure of the pressurizing device as well is sufficiently high, then the switch 3 is in its open position. The magnetic valve 17 is triggered and switches over, so that pressure medium from the pressurizing device is carried directly, that is bypassing the main cylinder, via the magnetic valves 23, 21, 22 into the brake circuits I and II, when pressure medium is required for building up pressure in one brake circuit I or II when the anti-skid device is functioning. A pressure reduction is effected via the magnetic valves 23, 21, 22 toward the intake side. The supply of pressure is effected until such time as the corresponding main cylinder piston 5 or 6 makes its return stroke and the 2/2-way valve 11 or 12 closes.

If the pressure of the pressurizing device is excessively low, the switch 3 closes and the warning light is eliminated. At the same time, the AND gate 25 is blocked and the magnetic valve 17 remains in its blocked position.

The above apparatus has the disadvantage that the brake pedal moves to a greater or lesser extent when the pressure is being supplied.

Figure 2:
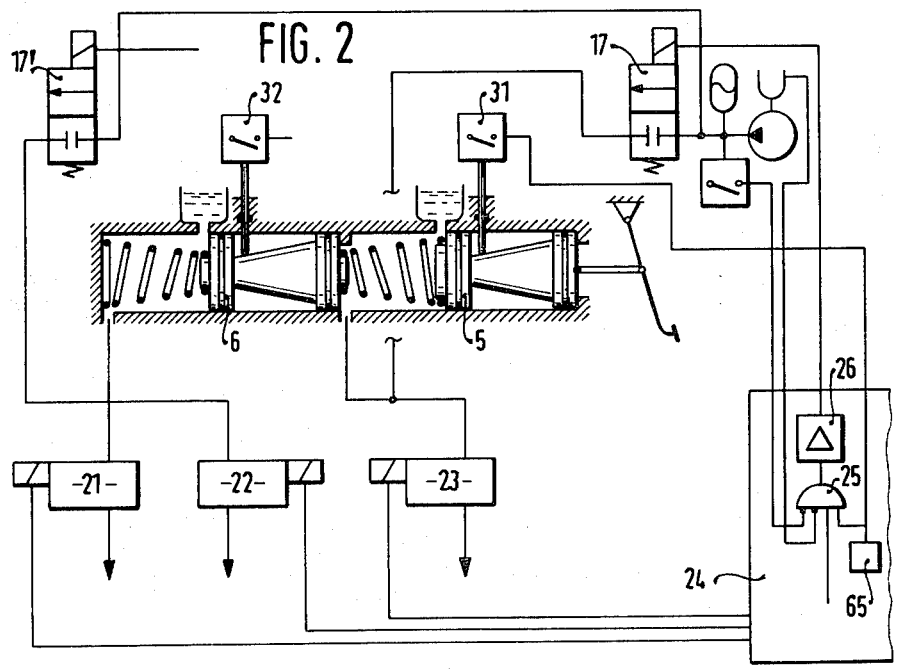
FIG. 2 is a modification of the structure shown in FIG. 1, having switches dependent on piston travel.
Figure 3:
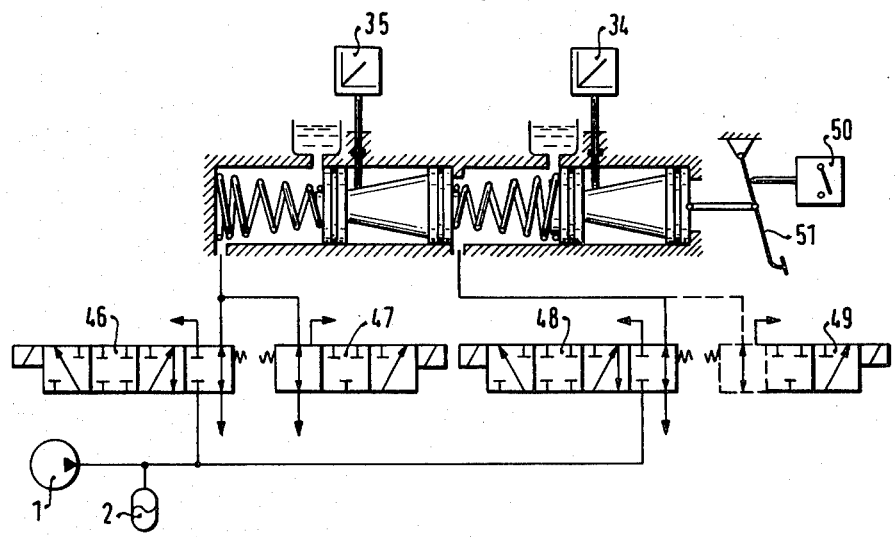
FIG. 3 shows a design having multiple-position magnetic valves.

This disadvantage is eliminated according to the invention in a design as shown in FIGS. 2 and 3 in that the valves 11 and 12 are replaced by simple switches 31 and 32 (in FIG. 2) or by linear signal transducers 34, 35 (FIG. 3). The respective response point of the switch 31 and 32 relates to the piston position in the main cylinder at which the anti-skid apparatus generally begins to function. By means of the switches 31, 32 or the signal transducers 34, 35, the movement of the main cylinder pistons 5 and 6 is signaled to the electronic switching device 24. By means of such a signal, the position of the main cylinder pistons 5 and 6 at a given time when the anti-skid device is functioning are stored in memory electronically, and this storage then serves as a set-point specification for supplying pressure.

Figure 5:
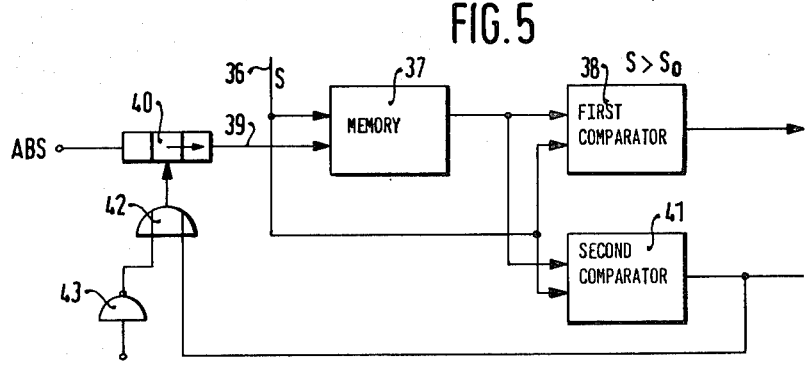
FIG. 5 shows an electronic circuit.

The electronic circuit required for this purpose is shown in FIG. 5. The signal prepared by the switch 31, 32 or by the signal transducer 34, 35 is proportional to the piston stroke and passes via a line 36 to a memory 37 and from there to a comparator 38. This signal is stored in the memory whenever the anti-skid signal ABS acts upon the memory 37 via a line 39 having a timing element 40. The output signal of the memory 37 serves as a set-point specification and is compared in the comparator 38 with the actual signal (piston travel). If the actual signal S is greater than the set-point specification 37, then pressure medium is supplied by triggering a predetermined valve position or magnetic valve position. If the actual piston stroke value is smaller than the stored set-point value, then in a second comparator 41 the actual piston stroke value is compared with the output of the memory and due to its output signal directed to OR gate 42, and the timing member is canceled via the OR gate 42, which simultaneously causes a shutoff of a memory. The negated signal of a brake light switch 43 simultaneously acts upon the OR gate and in the opened position again effects a cancellation of the timing element 40.

A diagnosis device 65 is also provided in the electronic switching device 24, and the signal of the switches 31, 32 or of the signal transducers 34 and 35 can be fed into this diagnosis device 65 (see FIG. 2).

In FIG. 2, differing from the design shown in FIG. 1, two 2/2-way valves 17 and 17' are used, of which the 2/2-way magnetic valve 17' monitors the pressure for the anti-skid magnetic valve 22. The remaining elements correspond to those shown in FIG. 1 and have the same reference numerals.

The triggering of the two 2/2-way magnetic valves 17 and 17' is effected via the AND gate 25 whenever the following conditions are satisified:
1. An anti-skid signal is present.
2. The switch 31 or 32 is actuated.
3. No warning signal from the pressurizing device is present.

FIG. 3 shows a design having multiple-position magnetic valves 46, 47, 48, and 49 as well as a switch 50 connected to a brake pedal 51. The supply of pressure takes place here in the second position of the two magnetic valves 46 and 48.

This design has the advantage that the brake pedal 51 will not travel to the floor when the anti-skid apparatus is functioning. Via the pedal position, the driver receives feedback as to the particular coefficient of friction existing at a particular time, for instance in the case of an icy road the point where pressure supply begins is already attained with a relative short pedal travel, and at this point a slight pedal vibration informs the driver that the antiskid apparatus is functioning. In contrast, with a high coefficient of friction, the point where pressure supply begins is attained only after a longer pedal stroke has been executed.

Figure 4:
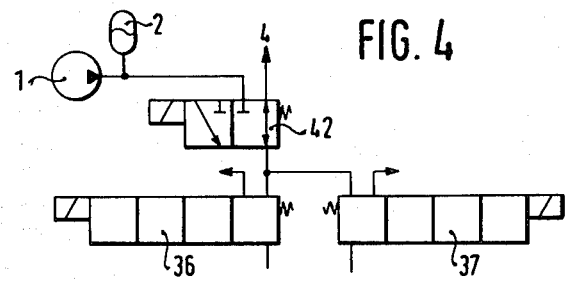
FIG. 4 shows a variant having a 3/2-way magnetic valve.

FIG. 4 shows a variant for supplying pressure via multiple-position valves. The supply of pressure is effected here via a 3/2-way magnetic valve 42, by way of which in the excited position, the pressure medium is delivered to the brake circuit.

Figure 6:
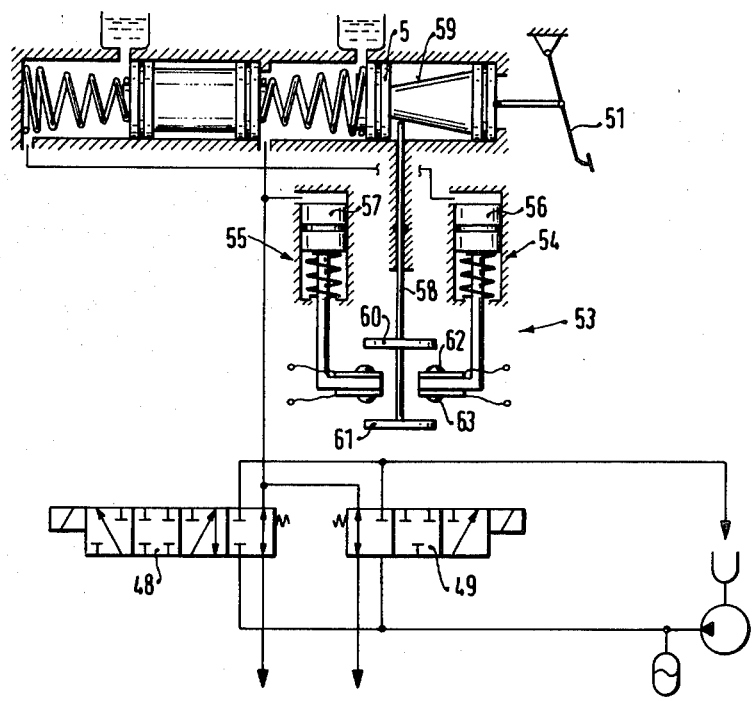
FIG. 6 shows a further modification.

The further modification shown in FIG. 6 has a special transducer system 53. Each brake circuit has a simple pressure tranducer 54, 55, each having a piston 56 and 57, respectively. The stroke of the pistons 56 and 57 is proportional to the effective braking pressure. The respective piston position is compared via a push rod 58 and via an oblique face 59 with the position of the first main brake cylinder piston. When the brake circuit is intact, equal travel exists for the movements of the push rod 58 actuated by the main brake cylinder piston 5 and of the two pistons 56 and 57; the transducer system 53 does not emit any signal. However, if this identical travel should be disturbed, for instance because of poor ventilation of the brake circuit, brake circuit failure or a withdrawal of brake medium when the anti-skid apparatus is functioning, then the switches 62 or 63 are closed via contacts 60 and 61. The corresponding signal can be delivered to the magnetic valve, for instance via final power stage, to the names for supplying pressure. The supply of pressure is terminated once again after the switch 62 or 63 opens.

In the case of brake circuit failure, despite the supply of pressure no pressure buildup will occur in the brake circuit. In this case, the supply of pressure is terminated via a time circuit, for instance for a period of 100 milliseconds, and at the same time the warning light indicating "brake circuit failure" is triggered.

The transducer system 53 may be made up of simple electrical contacts; however, it may also be realized in the form of an electronic transducer system. The contact position at switch 63 is attained when pressure medium is withdrawn from the brake circuit whenever too much pressure has been supplied. Here again, the supply of pressure is effected via the second position of one or both of the multiple-position valves 48 and 49.

Figure 7:
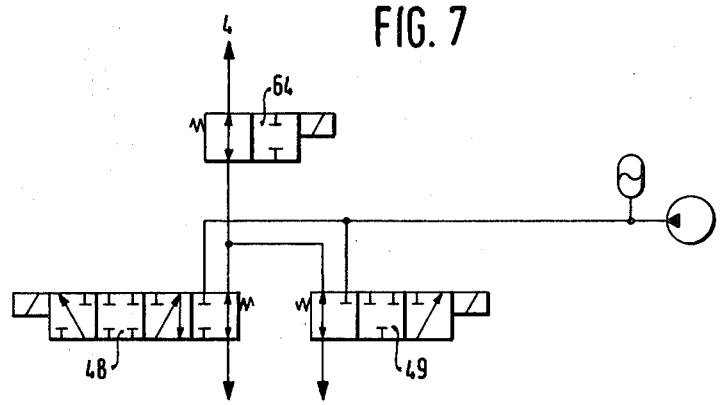
FIG. 7 shows a further embodiment having a forward drive control.

Finally, FIG. 7 shows a further embodiment of the structure of FIG. 3, for a means of forward drive control. In a realization of this kind, it is necessary to introduce pressure medium into the wheel brake cylinders of the driven wheels in order to brake the wheels. In this case, a 2/2-way magnetic valve 64 must be disposed in the connecting line from the pressure supply valve (multiple-position valve) to the main cylinder 4, because without this magnetic valve 64 the pressure medium which has been supplied would flow back via the expansion port of the main brake cylinder 4 into the reservoir of this main brake cylinder. When the forward drive control is functioning, that is, in response to the corresponding trigger signal, the 2/2-way magnetic valve 64 is excited and the connecting line is separated from the main brake cylinder 4.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A hydraulic dual-circuit servo brake apparatus having a dual circuit main cylinder equipped with two separate pistons, a pressurizing device and a control valve intended for directing the pressure medium of the pressurizing device into the brake circuits, characterized in that said control valve is a magnetic valve which is triggerable in accordance with the position of the main cylinder pistons, and an electronic switching device for monitoring triggering of said control valve.

2. A hydraulic dual-circuit servo brake apparatus as defined by claim 1 having an anti-skid apparatus, characterized in that said magnetic valve is monitored by said electronic switching device and is actuatable in accordance with the functioning of the anti-skid device.

3. A hydraulic dual-circuit servo brake apparatus as defined by claim 1, including two control valves, characterized in that triggering of the magnetic valve effected in accordance with the position at a given time of the main cylinder pistons can be performed by said two control valves, which are both embodied as 2/2-way valves.

4. A hydraulic dual-circuit servo brake apparatus as defined by claim 2, including two control valves, characterized in that triggering of the magnetic valve effected in accordance with the position at a given time of the main cylinder pistons can be performed by said two control valves, which are both embodied as 2/2-way valves.

5. A hydraulic dual-circuit servo brake apparatus as defined by claim 1, 2 or 3, characterized in that a separate magnetic valve is used for each brake circuit and that the triggering of each magnetic valve is effected by two control switches in accordance with the position at a given time of the main cylinder pistons.

6. A hydraulic dual-circuit servo brake apparatus as defined by claim 4, characterized in that a separate magnetic valve is used for each brake circuit and that the triggering of each magnetic valve is effected by two control switches in accordance with the position at a given time of the main cylinder pistons.

7. A hydraulic dual-circuit servo brake apparatus as defined by claim 6, characterized in that the response point of the two control switches is related to the main cylinder piston position at which the anti-skid apparatus begins to function.

8. A hydraulic dual-circuit servo brake apparatus as defined by claim 7, characterized in that the response point of the two control switches is ascertainable by means of comparison of the travel of the main cylinder piston with the actuated brake pressure.

9. A hydraulic dual-circuit servo brake apparatus as defined by claim 8, characterized in that the magnetic valves are integrated in at least one multiple-position magnetic valve of the anti-skid apparatus.

10. A hydraulic dual-circuit servo brake apparatus as defined by one of claim 7, 8 or 9, characterized in that the switching signal of the two control switches is cancellable preferably upon the return stroke of the main cylinder pistons and a reduction in brake pressure.

11. A hydraulic dual-circuit servo brake apparatus as defined by one of claim 1, 2, 3, 4, 6, 7, 8, or 9, characterized in that the supply of the pressure medium by the pressurizing device when the reservoir pressure is insufficient is ascertainable by means of a pressure switch and can be blocked via the electronic switching device and the magnetic valve.

12. A hydraulic dual-circuit servo brake apparatus as defined by claim 1, 2, 3, 4, 6, 7, 8, or 9, characterized in that triggering of the magnetic valve effected in accordance with the position at a given time of the main cylinder pistons can be performed by said two control valves, which are both embodied as 2/2-way valves.

13. A hydraulic dual-circuit servo brake apparatus as defined by claim 9, characterized in that the main cylinder is equipped with linear signal transducers for the main cylinder pistons.

14. A hydraulic dual-circuit servo brake apparatus as defined by claim 6, characterized in that the signal of the control switches can be fed into a diagnosis device.

15. A hydraulic dual-circuit servo brake apparatus as defined by claim 1, 2, 3, 4, 6, 7, 8, 9, 13 or 14, characterized by the use of at least one additional 2/2-way magnetic valve for monitoring the supply of pressure in the case of anti-skid control.

* * * * *